United States Patent [19]
Jancke et al.

[11] Patent Number: 5,917,499
[45] Date of Patent: *Jun. 29, 1999

[54] INTERACTIVE GRAPH DISPLAY SYSTEM

[75] Inventors: Gavin Jancke, Issaquah; Casey Lang Kiernan, Redmond, both of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/628,871

[22] Filed: Apr. 5, 1996

[51] Int. Cl.⁶ .................................................. G06F 15/00
[52] U.S. Cl. ............................................................ 345/440
[58] Field of Search ...................... 395/140, 141, 395/142; 345/440, 441, 442, 333, 334, 335

[56] References Cited

U.S. PATENT DOCUMENTS

| | | | |
|---|---|---|---|
| 5,459,825 | 10/1995 | Anderson et al. | 395/133 |
| 5,586,237 | 12/1996 | Baecker et al. | 395/133 |
| 5,619,631 | 4/1997 | Schott | 395/140 |

*Primary Examiner*—Phu K. Nguyen
*Attorney, Agent, or Firm*—Duft, Graziano & Forest, P.C.

[57] ABSTRACT

An interactive graph display system for storing a sequence of present values in a memory for at least one display element, generating a graph primitive on a display wherein the graph primitive is comprised of at least one display element, dynamically updating any of the at least one display element in the display, and generating display element details for one of the at least one display element in response to a user input command. Generating a graph primitive includes generating a scale for each of the at least one display element in the graph primitive, and scaling each of the at least one display element according to the scale for each of the at least one display element in the graph primitive.

30 Claims, 4 Drawing Sheets

INTERACTIVE GRAPH DISPLAY SYSTEM

FIELD OF INVENTION

This invention relates to the field of computer displays, and in particular to a system for generating and dynamically updating a graph primitive comprised of at least one display element, and for generating and dynamically updating additional display element details for either an individual display element or a combination of display elements in response to at least one user input command, all in a manner that is comprehensible at a glance by a computer user.

PROBLEM

Present day computers and computer systems function with increasingly complex operating system software and application system software. Although acceptable performance by a computer or computer system differs from one computer user to the next, achieving acceptable performance is an equally complex problem for computer users who are concerned about such matters. For example, to effectively administer, maintain, and/or "tune" a distributed database to achieve a desired level of database performance, a database administrator must consider the past and present status of numerous hardware and software resources across the system that can each adversely affect a desired database performance level. On a smaller but not necessarily less complex scale, a personal computer user might need to "tune" the hardware and/or software of an isolated personal computer to obtain a desired level of personal computer performance for a particular use in view of the hardware configuration on which a computer program is running. In either of the above examples, it is a problem to generate a display of complex administrative, maintenance, and/or performance information that is easily manipulated by a computer user and is comprehensible at a glance by a computer user. The format and the lack of flexibility of the format in which present information is made available to a computer user of existing operational display systems, renders otherwise useful information incomprehensible. In addition, attempting to simultaneously display default information with historic, real time, and/or future projection information only adds to the complexity and incomprehensible nature of existing operational displays.

A listbox is a typical operational information display in a Windows® environment. A listbox is often generated in response to a computer user selecting a menu item from a drag-down, pull-down, pop-up, or other menu type display. A listbox is useful for displaying detailed information in character form where the information is ordered in categories by row and/or column within the listbox. However, the information in a listbox is fragmented because each character or set of characters therein represents an independent piece of information that must be individually interpreted. Further, the listbox fragmentation makes it difficult for a viewer to comprehend any meaning that may exist due to relationships among the categories of related display elements in a display.

Relationships among different categories of display elements are more readily comprehended by a human if displayed in a pictorial form such as a bar graph or pie chart. However, useful details that are available in a listbox form of display are not as easily comprehended when the same information is presented in pictorial form. Although the user can be given the choice of simultaneously viewing the same information in character form or pictorial form, or the ability to switch back and forth between the same information in different character form or pictorial form displays, viewing complete sets of information in character form and pictorial form requires exceptional concentration on the part of the viewer who must become reoriented in the information being displayed in the competing perspective.

Therefore, there exists a need for a uniform information display that provides multiple levels of data details that are easily manipulated by a computer user and are all comprehensible at a glance in response to at least one user input command. A solution to this problem has heretofore not been disclosed prior to the invention as disclosed and claimed herein.

SOLUTION

The above described problems are solved and an advance achieved in the field of computer generated graph displays by the interactive graph display system of the present invention. The interactive graph display system includes a method and apparatus for storing a sequence of present values in a memory for each of at least one display element, generating a graph primitive on a display wherein the graph primitive is comprised of at least one display element, dynamically updating any display element in the display, and generating a display of display element details for one of the at least one display element in response to a user input command. The means and apparatus for generating a graph primitive includes generating a scale for each of the at least one display element in the graph primitive, and scaling each of the at least one display element according to the scale for each of the display elements in the graph primitive.

The interactive graph display system further includes overlaying or superimposing one display element onto at least one other display element within the graph primitive, wherein the superimposed or overlaid display elements are distinguishable by a unique display characteristic selected from at least one of the group consisting of: color and graphic.

In the context of the present discussion, a color or color indicia includes, but is not limited to any hue, shade, fade, color spectrum, color continuum, or any combination thereof that is supported by an accompanying display device. A graphic or graphic indicia includes, but is not limited to any geometric, multidimensional, alphanumeric, graphic icon, or other character combination capable of being displayed by an accompanying display device.

DETAILED DESCRIPTION

Figure 1:
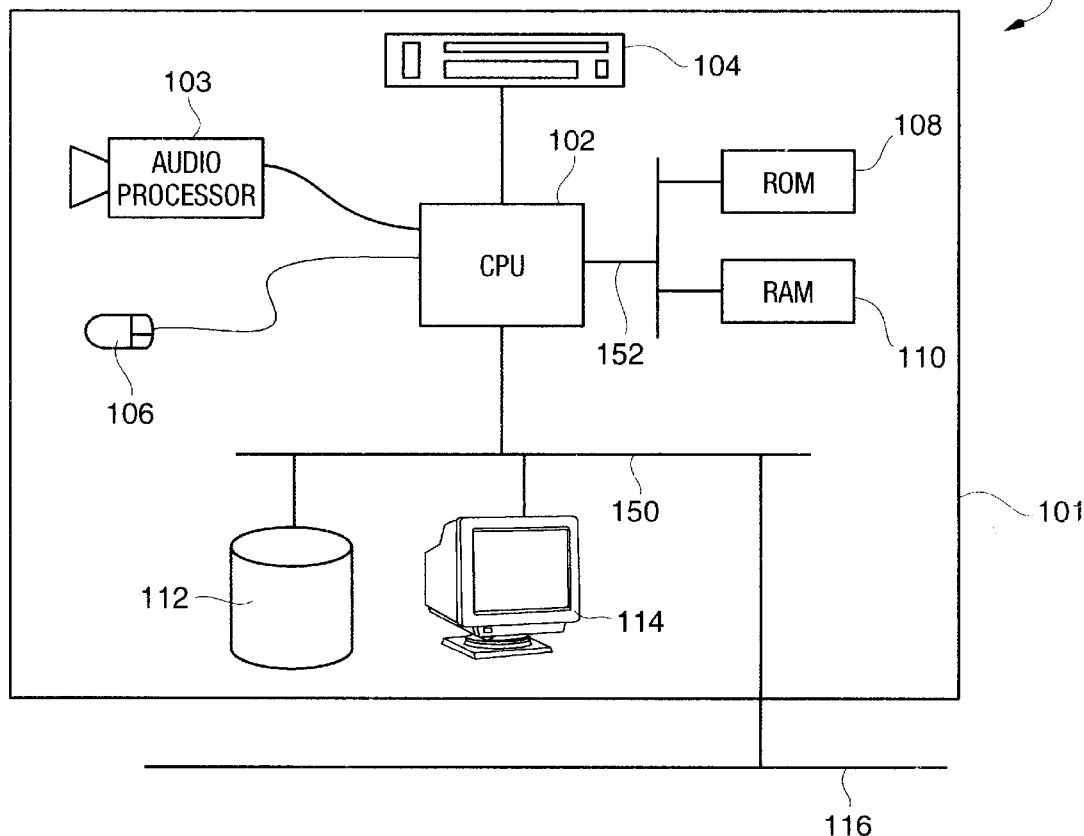
FIG. 1 illustrates a hardware configuration in block diagram form.

Hardware Environment—FIG. 1

FIG. 1 illustrates an example hardware environment for a computer system 100. The graph display system of the present invention is operable in any of several standard computer systems readily available in the industry that have similar components to computer system 100. Programmed instructions for the graph display system are executable on processor 102. Processor 102 stores and/or retrieves the programmed instructions and/or data from memory devices that include, but are not limited to, Random Access Memory (RAM) 110 and Read Only Memory (ROM) 108 by way of memory bus 152, and non-volatile memory device 112 by way of local bus 150. User input to computer system 100 is entered by way of keyboard 104 and/or pointing device 106 otherwise known as a multi-button mouse. Human readable output from computer system 100 is viewed on display 114. Additional audio output is generated by audio processor 103. Access to external computers and computer systems are accessible to computer system 100 by way of Local Area Network (LAN) 116 in a manner well known in distributed computing and computer networking art.

Figure 2:
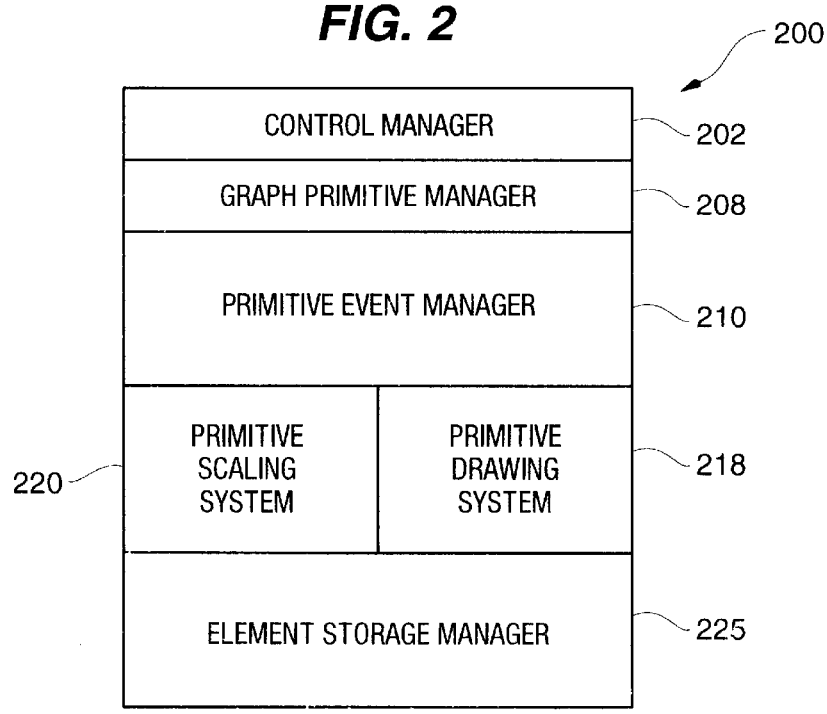
FIG. 2 illustrates a process hierarchy in block diagram form.

Process Hierarchy and Function—FIG. 2

FIG. 2 illustrates the hierarchy and function of the processes 200 supporting the interactive graph display system. The Control Manager 202 is the window logic and control for the interactive graph display system. Functions of the Control Manager 202 include, but are not limited to, capturing and processing input from user devices including keyboard and pointer control devices, and acting as the message interface for client application requests. Client application requests include, but are not limited to, requests for status as to the type of graph primitive presently being displayed, and what values are presently displayed for a given display element. The Control Manager 202 is also the driver for the Element Storage Manager 225. Substantive data underlying the graph primitive presently being displayed, is treated generically by the driver portion of the Control Manager 202, in that the data values are the same regardless of the type of graph primitive in which the data values are quantifiably displayed, and the client applications requesting information about the present graph primitive do not require specific knowledge of the graph primitive.

The Graph Primitive Manager 208 is an interface that isolates the Control Manager 202 from a specific graph primitive being displayed. Isolating the Control Manager 202 from direct contact with a graph primitive allows the option to define additional graph primitives without altering the Control Manager 202 or the Control Manager's interface to client applications.

The Primitive Event Manager 210 controls the graph primitive being displayed. Control features of the Primitive Event Manager 210 include, but are not limited to, selecting the display elements displayed within the graph primitive, interpreting user input commands, identifying which display element is selected by a user input command, adding new display elements to the graph primitive, sizing and scaling the display elements within the graph primitive by way of the Primitive Scaling System 220 and Primitive Drawing System 218, and scrolling the graph primitive display in response to a user input command.

The Primitive Scaling System 220 performs the actual graph primitive manipulations. The graph primitive manipulations include, but are not limited to, calibrating the graph scales in view of the number of display elements and the size of the graph primitive area, and providing scale information in response to a request to the Primitive Drawing System 218. The Primitive Scaling System 220 also responds to requests from the Primitive Event Manager 210 for scale information to correctly determine which display element within the graph primitive has been selected for additional details, and to requests from the Primitive Drawing System 218 for the correct number of scale tick marks on a graph primitive and to correctly draw the graph primitive to the proper size and scale.

The Primitive Drawing System 218 generates the actual graph primitive. The graph primitive generation includes drawing, scaling, and labeling the graph primitive according to the specification stored by the Primitive Scaling System 220 in the Element Storage Manager 225. Types of graph primitives generated by the Primitive Drawing System 218 include, but are not limited to, bar graphs, pie charts, scatter graphs, and custom user defined graphs. Types of display element configurations generated by the Primitive Drawing System 218 include, but are not limited to, single series single scale display entities, multiple series single scale display entities, single series multiple scale display entities, and multiple series multiple scale display entities. Series and scales are defined in the text accompanying FIGS. 4–7.

The Element Storage Manager 225 maintains all information related to each display element available to a client application. The display element information includes the basic graph primitive type information and the more extensive display element detail information. The display element information is accessed by the Primitive Scaling System 220 and the Primitive Drawing System 218, and is controlled by the driver portion of the Control Manager 202.

Each of the above identified processes can be written in any standard programming language commercially available in the industry using standard programming techniques that are known and practiced in the art.

Figure 3:
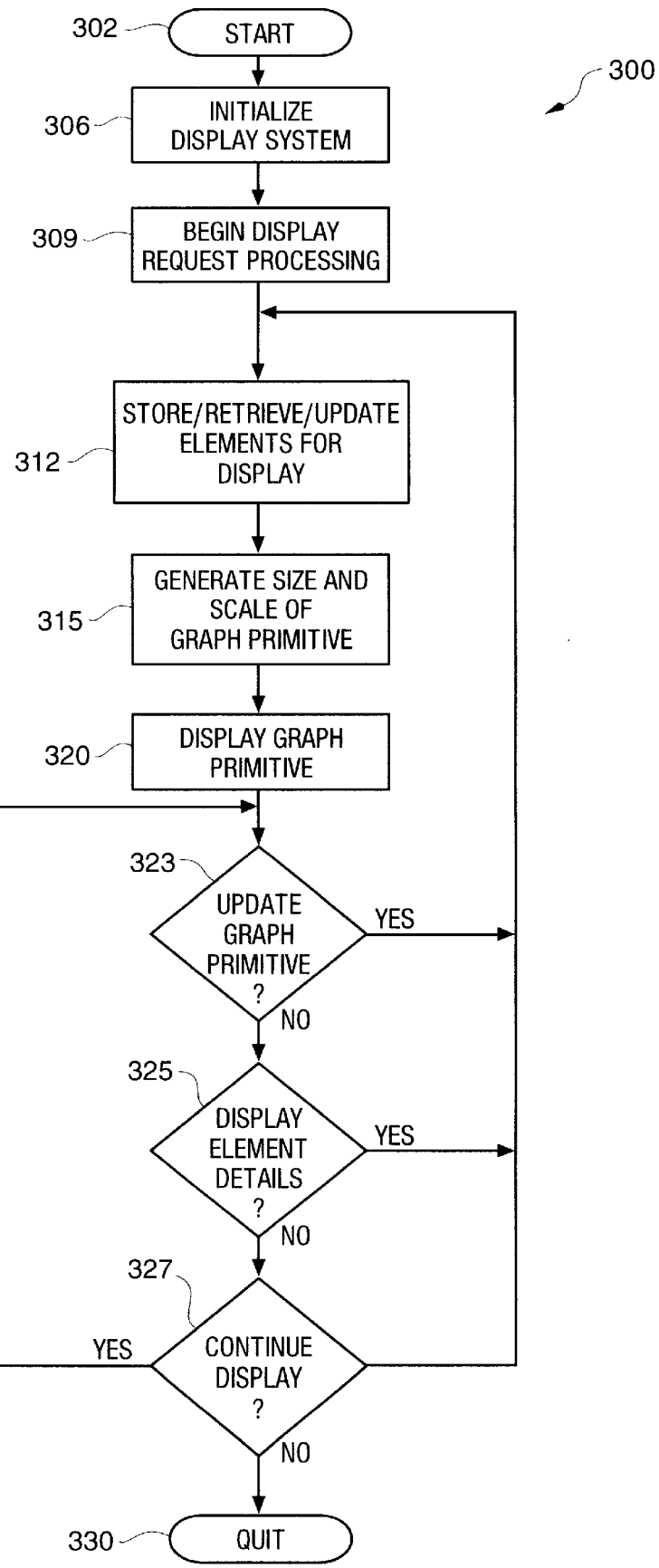
FIG. 3 illustrates the graph display system operational steps in flow diagram form.

Graph Display System Operational Steps—FIG. 3

FIG. 3 illustrates the graph display system operational steps 300 in flow diagram form. The graph display system operational steps 300 start at step 302 and proceed to system initialization at step 306. Display system initialization includes, but is not limited to, obtaining and/or clearing memory, and starting the graph display system processes 200 either when the system is powered-up or the system is otherwise recycled in a manner that requires the graph display system to reinitialize. At step 309, the graph display system begins accepting and processing display requests from client applications or by user input command. The graph display system is continuously available to accept and process new display requests.

Display elements are stored, retrieved, or updated at step 312 by the display system processes 200 defined previously. A display element is an individual data entity capable of being displayed as a self contained piece of information in a graph primitive. For example, a bar is a display element in a bar graph primitive. Note however, that the raw substantive data of any one display element is transparent to the various types of graph primitives in which each display element can be displayed. Storing display element information is typically performed when a new display element is added or an existing display element information is updated in memory. The display element information includes scaling and size information. Retrieving display element information is typically performed when a request is made to generate a graph primitive containing at least one display element, or when a client application needs information about a display element. Updating display element information is typically performed in real time to a live graph primitive being displayed, when new information becomes available for at least one of the display elements within the graph primitive.

Display element size and scale information is retrieved from the Element Storage Manager 225 by the Primitive Scaling System 220 at step 315. If no size and/or scale information is available or new size and/or scale information must be created for a requested graph primitive, the Primitive Scaling System 220 generates the necessary parameters in view of the type of graph primitive being displayed. The graph primitive and its at least one display element are generated in human readable form at step 320.

The graph primitive displayed at step 320 is updatable at decision step 323 any time new information is available for any of the at least one display elements. If new display element information is available at decision step 323, then processing continues at step 312. If no new information is presently available at decision step 323, then processing continues at decision step 325.

If a user input command is received or a client application requests details for a particular display element at decision step 325, then processing continues at step 312 where the necessary display element detail information is retrieved from the Element Storage Manager 225 and the overall graph primitive display is updated in the normal course of processing previously described. If no display element details are requested at decision step 325, then processing continues at decision step 327.

Decision step 327 determines whether the overall graph primitive display will continue or not. If the display is terminated at decision step 327, then the graph display processes 200 clean up the present graph display and processing quits at step 330. If the graph primitive display is to remain active at decision step 327, then processing continues at decision step 323 as previously described.

Graph Primitive Display Examples—FIGS. 4–7

Figure 4:
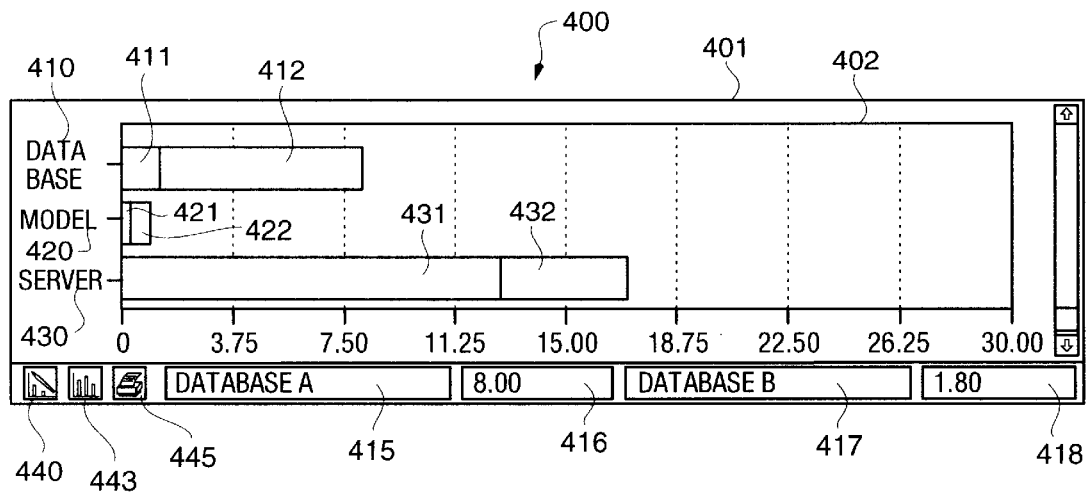
FIG. 4 illustrates a multiple series display with character labels in bar graph primitive form.

FIG. 4 illustrates a graph primitive embodiment 400 including a window 401 and a graph primitive 402 for a traditional bar graph. The graph primitive 402 contains three display elements 410, 420, and 430. Each display element 410, 420, and 430 are single scale multiple series bars. A single scale is illustrated by the horizontal scale markings in the graph primitive 402 and no vertical scale markings. A multiple series bar is illustrated, for example, in display element 410, as a bar having a first series 411 overlaying a second series 412. Each series 411 and 412 represent distinguishable but related information that is displayed by overlaying a first series 411 on a second series 412. One use of a multiple series display element can be to illustrate peak and off-peak demand for a particular resource. Another use of a multiple series display element can be to illustrate maximum and minimum resource availability. In the present illustration, each of the display elements 410, 420, and 430 have a first and second series identified as 411–412, 421–422, and 431–432 respectively. It is not necessary for each display element in a graph primitive to have the same number of series or any series at all.

In the present embodiment, display element details are displayed along the border fields of graph primitive 402. Label and quantity information for the first series of display element 410 are displayed in border fields 415–416, and the second series label and quantity information are displayed in border fields 417–418. The display element details can be changed from display element to display element by either selecting a display element with pointer device, scrolling the window scroll bar, or keyboard input by a user.

Graph primitive customizing features are available by selecting any of the feature fields 440, 443, or 445. Feature field 440 provides general graph configuration options including graph label and scale customization. Feature field 443 provides custom graph fill and color options. Feature field 445 provides custom screen dump and printing options. One additional configuration feature includes setting high and/or low watermarks for a given resource and generating an audio indicator or wave file indicator to notify the user of the condition.

Figure 5:
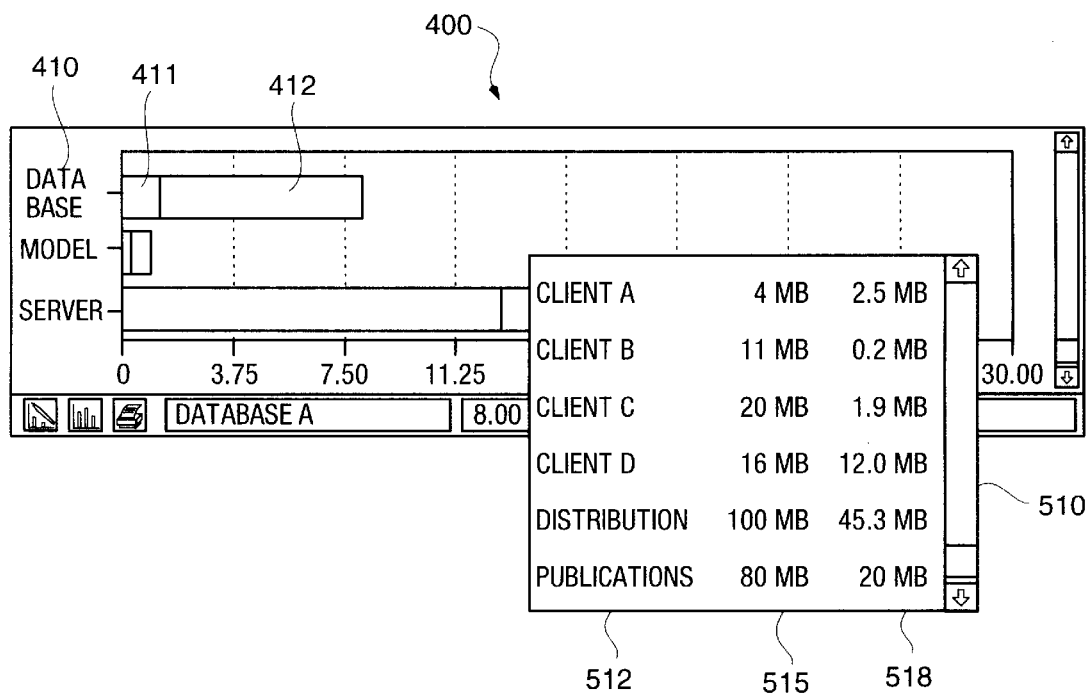
FIG. 5 illustrates a multiple series display with pop-up element detail overlay.

FIG. 5 illustrates an alternative to the graph primitive display embodiment 400 of FIG. 4. The FIG. 5 embodiment includes all features disclosed for FIG. 4, in addition to a further detailed display element detail pop-up window 510. Pop-up window 510, also known as a listbox, contains additional information not capable of being pictorially captured or otherwise displayed in addition to the border fields 415–418 of FIG. 4. In the present example, pop-up window 510 includes network wide information for network resources 512 that are related to display element 410, in addition to respective first series 515 and second series 518 information for each network resource 512. Pop-up window 510 can include any detailed information relating to the respective display element. Activating the pop-up window 510 can be by double click of a pointer device, keyboard command, scrolling, customizing, or any other indicator.

Figure 6:
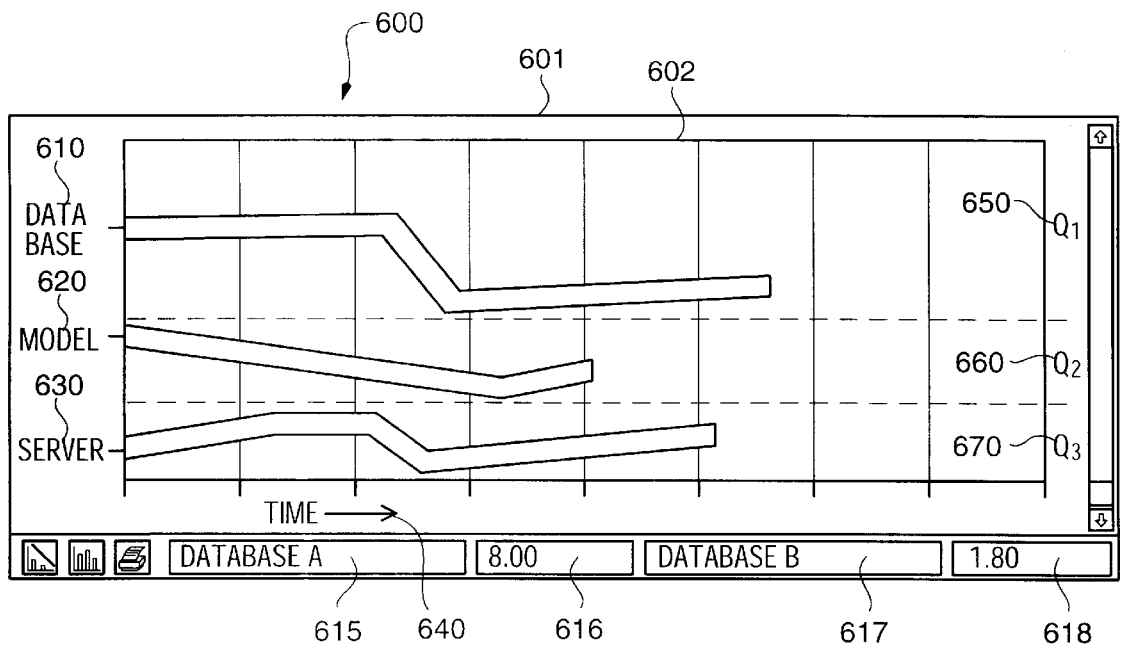
FIG. 6 illustrates a single series display with past and present element representations.

FIG. 6 illustrates an alternative graph primitive embodiment 600 including a window 601 and a graph primitive 602 for a hybrid bar graph and bar chart that displays historic values over time and a present or even future predicted values for a display element provided the information is available from the Element Storage Manager 225. For consistency of examples only, the graph primitive 602 contains three display elements 610, 620, and 630. Any number of graph elements can be included in the scrollable graph primitive. Each display element 610, 620, and 630 are multiple scale multiple series bars. The multiple scale is illustrated by the horizontal time scale 640 and the vertical quantity scales 650, 660, and 670. The vertical quantity scales 650, 660, and 670 can be the same or different as the relation between the display elements requires. The multiple series are illustrated by the first series in border fields 615–616 and the second series in border fields 617–618. The display element details can be changed from display element to display element by either selecting a display element with pointer device, scrolling the window scroll bar, or keyboard input by a user. All other graph primitive customizing features as disclosed in FIGS. 4 and 5. Further, the display element detail pop-up window 510 of FIG. 5 can be included in the present graph primitive embodiment 600.

Figure 7:
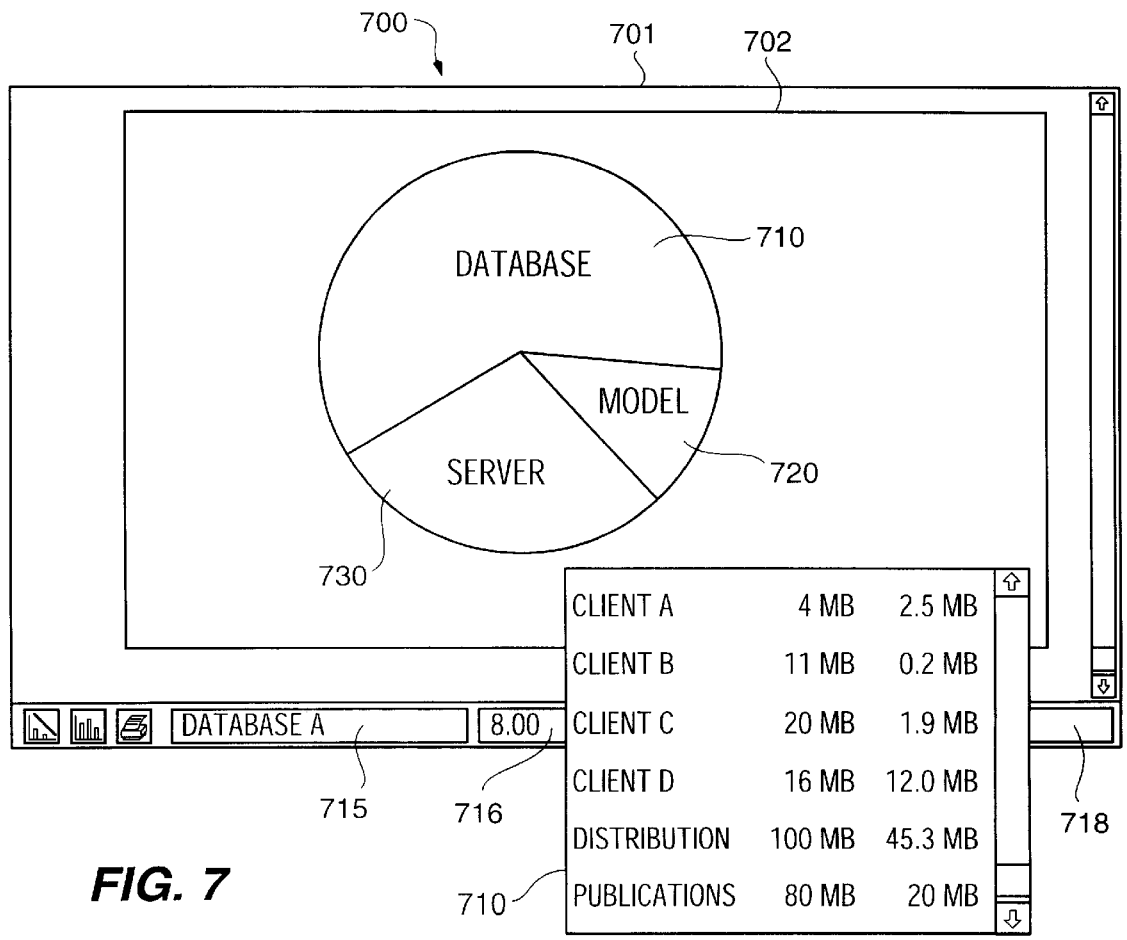
FIG. 7 illustrates a single series display with pop-up element detail overlay.

FIG. 7 illustrates an alternative graph primitive embodiment 700 including a window 701 and a graph primitive 702 for a pie chart. For consistency of examples only, the graph primitive 702 contains three display elements 710, 720, and 730. Any number of graph elements can be included in the rotatable graph primitive. The multiple series of each display element 710, 720, and 730 are illustrated by the first series in border fields 715–716 and the second series in border fields 717 (obscured) and 718. The display element details can be changed from display element to display element by either selecting a display element with pointer device, scrolling the window scroll bar, or keyboard input by a user. All other graph primitive customizing features as disclosed in FIGS. 4–6. Further, the display element detail pop-up window 510 of FIG. 5 can be included in the present graph primitive embodiment 700 as illustrated by the pop-up window 740.

SUMMARY

The interactive graph display system of the present invention includes a method and apparatus for generating a graph primitive having at least one display element therein, where the at least one display element is dynamically updatable, and additional display element details can be generated for any one display element in response to a user input command. Although specific embodiments of this invention are disclosed herein, it is expected that persons skilled in the art can and will design alternative embodiments of this invention that fall within the scope of the following claims either literally or under the Doctrine of Equivalents.

We claim:

1. A method for providing an interactive graph on a display, the method comprising:
    in a memory, storing a series of values for each of a plurality of display elements when the values are generated for each of the display elements;
    displaying a graph comprised of the display elements;
    automatically updating the graph in response to storing the values in the memory;
    in response to a user input, displaying at least two superimposed levels of detail for at least one of the display elements; and
    displaying an overlay of at least two of the display elements distinguishable by a unique display characteristic.

2. The method of claim 1 further comprising:
    generating a scale for each of the display elements in the graph; and
    displaying each of the display elements in the display according to the scale for each of the display elements.

3. The method of claim 1 further comprising generating a stimulus when one of the display elements exceeds a threshold.

4. The method of claim 3 wherein the stimulus is used to notify a user.

5. The method of claim 1 further including displaying a display element history comprised of said series of values for at least one of said display elements.

6. The method of claim 5 further including generating at least one additional value based on said series of values.

7. A program storage device readable by a computer, said program storage device tangibly embodying instructions executable by said computer to perform method steps for providing an interactive graph on a display, the method comprising:
    in a memory, storing a series of values for each of a plurality of display elements when the values are generated for each of the display elements;
    displaying a graph comprised of the display elements;
    automatically updating the graph in response to storing the values in the memory;
    in response to a user input, displaying at least two superimposed levels of detail for at least one of the display elements; and
    displaying an overlay of at least two of the display elements distinguishable by a unique display characteristic.

8. The program storage device of claim 7 further comprising:
    generating a scale for each of the display elements in the graph; and
    displaying each of the display elements in the display according to the scale for each of the display elements.

9. The program storage device of claim 7 further comprising generating a stimulus when one of the display elements exceeds a threshold.

10. The program storage device of claim 9 wherein the stimulus is used to notify a user.

11. The program storage device of claim 7 further including displaying a display element history comprised of said series of values for at least one of said display elements.

12. The program storage device of claim 11 further including generating at least one additional value based on said series of values in response to an absence of one of said series of values.

13. A method for displaying an interactive graph, said method comprising:
    storing a sequence of present values in a memory as they occur in real time for each of plurality of display elements;
    generating at least one graph primitive on a display wherein said at least one graph primitive is comprised of said plurality of display elements;
    dynamically updating said plurality of display elements in said display in real time independent of any intervention by a human user;
    generating a superimposed display of at least one level of display element detail for any one of said plurality of display elements in response to a user input command; and
    overlaying at least two display elements within said at least one graph primitive wherein each of said at least two display elements are distinguishable by a unique display characteristic.

14. The method of claim 13 further including generating a scale for each of said plurality of display elements in said at least one graph primitive, wherein said at least one graph primitive is a graph; and scaling each of said plurality of display elements according to said scale for each of said plurality of display elements in each of said at least one graph primitive.

15. The method of claim 13 further including the step of displaying a display element history comprised of said series of present values for one of said plurality of display elements.

16. The method of claim 15 further including the step of generating at least one virtual present value to complete said series of present values in response to an absence of one of said series of present values.

17. The method of claim 13 further including the step of generating a sensory stimulus to notify said human user of a predefined display element threshold.

18. An interactive graph display system comprising:
    means for storing a sequence of present values in a memory as they occur in real time for each of a plurality of display elements;
    means for generating at least one graph primitive on a display wherein said at least one graph primitive is comprised of said plurality of display elements;
    means for dynamically updating said plurality of display elements in said display in real time independent of any intervention by a human user;
    means for generating a superimposed display of at least one additional level of display element detail for any one of said plurality of display elements in response to a user input command; and
    means for overlaying at least two display elements within said at least one graph primitive wherein each of said at least two display elements are distinguishable by a unique display characteristic.

19. The system of claim 18 wherein said means for generating said at least one graph primitive includes: means for generating a scale for each of said plurality of display elements in said at least one graph primitive, wherein said at least one graph primitive is a graph; and means for scaling each of said plurality of display elements according to said scale for each of said plurality of display elements in each of said at least one graph primitive.

20. The system of claim 18 further including means for displaying a display element history comprised of said series of present values for one of said plurality of display elements.

21. The system of claim 20 further including means, responsive to an absence of one of said series of present values, for generating at least one virtual present value to complete said series of present values.

22. The system of claim 18 further including means for generating a sensory stimulus to notify said human user of a predefined display element threshold.

23. A program storage device readable by a computer, said program storage device tangibly embodying instructions executable by said computer to perform method steps for displaying an interactive graph, said method comprising:

storing a sequence of present values in a memory as they occur in real time for each of plurality of display elements;

generating at least one graph primitive on a display wherein said at least one graph primitive is comprised of said plurality of display elements;

dynamically updating said plurality of display elements in said display in real time independent of any intervention by a human user;

and generating a superimposed display of at least one additional level of display element detail for any one of said plurality of display elements in response to a user input command.

24. The program storage device of claim 23, wherein said step of generating said at least one graph primitive includes: generating a scale for each of said plurality of display elements in said at least one graph primitive, wherein said at least one graph primitive is a graph; and scaling each of said plurality of display elements according to said scale for each of said plurality of display elements in each of said at least one graph primitive.

25. The program storage device of claim 23, having further instructions for performing the step of overlaying at least two display elements as a set of series within said at least one graph primitive, wherein each of said at least two display elements are distinguishable by a unique display characteristic.

26. The program storage device of claim 23, having further instructions for performing the step of displaying a display element history comprised of said series of present values for one of said plurality of display elements.

27. The program storage device of claim 26, having further instructions for performing the step of generating at least one virtual present value to complete said series of present values in response to an absence of one of said series of present values.

28. The program storage device of claim 23, having further instructions for performing the step of generating a sensory stimulus to notify said human user of a predefined display element threshold.

29. A program storage device readable by a computer, said program storage device tangibly embodying instructions executable by said computer to perform method steps for displaying an interactive graph, said method comprising:

storing a sequence of present values in a memory as they occur in real time for each of a plurality of display elements;

scaling each of said plurality of display elements according to a predetermined scale for each of said plurality of display elements;

overlaying at least two display elements within said graph primitive wherein each of said at least two display elements are distinguishable by a unique display characteristic;

generating at least one graph primitive on a display wherein said at least one graph primitive is a graph comprised of said plurality of display elements;

dynamically updating said plurality of display elements in said display; and generating a superimposed display of at least one level of display element detail for any one of said plurality of display elements in response to a user input command.

30. The program storage device of claim 29, having further instructions for performing the step of displaying a display element history comprised of said series of present values for one of said plurality of display elements.

\* \* \* \* \*